United States Patent Office 3,266,789
Patented August 16, 1966

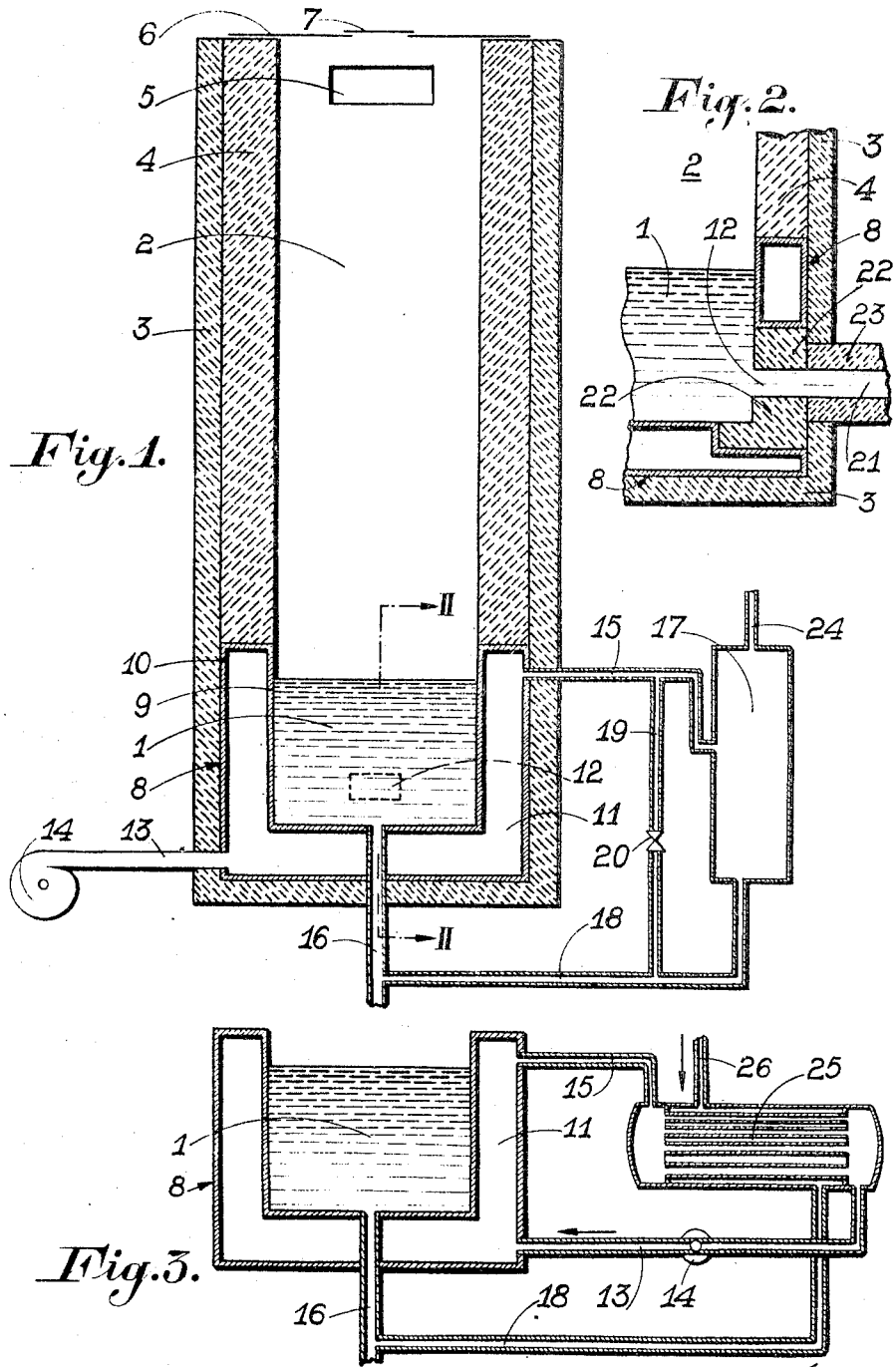

3,266,789
APPARATUS FOR MELTING PRODUCTS SUCH AS GLASS AND METHOD OF WORKING THE SAME
Georges Henry and Edgard Brichard, Jumet, and Emile Plumat, Gilly, Belgium, assignors to S. A. Glaverbel, Brussels, Belgium, a company of Belgium
Filed Dec. 15, 1961, Ser. No. 159,536
Claims priority, application Belgium, Dec. 19, 1960, 475,858
8 Claims. (Cl. 263—29)

The invention relates to an apparatus for melting and working products such as glass, enamels, fused silicates and in general products exhibiting the phenomenon of pasty fusion at high temperature.

The tanks and crucibles at present employed for melting and working these products are constructed of refractory bricks, which have considerable disadvantages. In contact with molten products, these materials may be corroded and give rise to the dissolution of certain constituents in the products. The dissolution frequently results in defects in transparency in the finished products. Corrosion of the refractories also gives rise to the introduction, into the products being worked, of brick fragments which are neither melted nor dissolved in the products and which result in opaque inclusions in the finished products. The corrosion is not uniformly distributed throughout the parts of the furnace, but develops preferentially in certain regions, for example at the glass-atmosphere interface. It is found that the refractory bricks are more rapidly corroded at this level than at the other levels, so that they must frequently be replaced.

Refractory materials have the further disadvantage that they introduce into the products being worked gas bubbles which must generally be removed by high-temperature refining. Finally, since the working of glass and glass-like products takes place at very high temperature, it is necessary to employ special-quality and therefore costly refractory materials.

It has already been proposed to blow air or steam or to spray water on to the external walls of the furnace, but this is only a makeshift solution, because the refractory materials are subjected to considerable thermal stresses and because all the heat removed from the wall is dissipated in the atmosphere. It has further been proposed to embed cooling ducts in the refractory walls, but this does not prevent all the disadvantages which have been described.

In accordance with the invention, the tank or crucible of the furnace comprises double walls containing the products being worked, which form a fluid-tight metallic jacket through which a cooling fluid is circulated. Metals capable of resisting deformations and corrosion by the glass and the atmosphere at high temperatures are rare and very costly. In accordance with the invention, the cooled metal is maintained at a fairly moderate temperature, which may be chosen within fairly wide limits. Although the jacket may be made of a noble or corrosion-resistant metal, such as platinum, it will preferably be made of a commoner metal or alloy, which may optionally be covered by a layer of more resistant material. The metal chosen will be, for example, a carbon steel or an alloy steel or a chrome-nickel alloy. This metal may be covered by a thin layer of a protective material chosen from the noble metals, such as platinum, the refractory alloys such as a chrome-nickel alloy, or a mixture of sparingly fusible oxides, such as a refractory enamel.

The metallic jacket is advantageously interrupted in the neighbourhood of the outlet point for the fused product and a refractory brick wall is inserted therein. As a result of the cooling to which the wall of the tank is subjected by the cooling fluid circulating therein, the said wall generally becomes covered by a layer of congealed products. In order to prevent this layer from blocking the outlet orifices, the zone of the tank which surrounds these orifices and in which the wall of refractory materials is inserted is not cooled. It is also possible to provide a larger outlet orifice such that a channel of fused products remains. The outer face of the metallic jacket is advantageously carefully thermally insulated, whereby dissipation of the heat extracted by the cooling fluid into the atmosphere is prevented.

In the working of the furnace, the heat received by the cooling fluid is recovered. In a particularly advantageous embodiment, there is employed as cooling fluid a fluid with which the burners of the furnace are fed, such as the combustion-assisting agent. By this method, the heat carried away by the cooling fluid is directly recycled in the furnace by the burners. Preferably, the hot combustion-assisting agent leaving the metallic jacket is superheated before being introduced into the burners. The superheating of the combustion-assisting gas may be effected in an apparatus specially designed for this purpose. Alternatively, it may be effected by introducing the combustion-assisting agent into a regenerator or into a recuperator of the furnace. In particular, if all the combination-assisting gas does not circulate in the metallic double wall, the hot gas will be introduced, for example, at an intermediate point of the recuperator or regenerator, at which the cold combustion-assisting agent directly introduced into the recuperator or regenerator has reached a temperature approximately equal to that of the hot combustion-assisting agent leaving the double wall.

In another embodiment, a third fluid is circulated through the metallic jacket, which fluid thereafter gives up to the combustion-assisting agent of the burners the heat received in the jacket. This intermediate fluid is preferably chosen from the fluids inert to the metal of which the double wall is constructed.

It is obvious that it is also possible in accordance with the invention to heat the fuel feeding the burners rather than the combustion-assisting agent, whether the fuel serves as a cooling fluid or whether it is heated in a heat exchange apparatus by an intermediate fluid heated in the metallic jacket.

The rate of flow of the cooling fluid in the double wall is preferably so adjusted that a layer of product being worked remains congealed against the wall. In this way, the extraction of heat from the furnace is reduced and the wall of the jacket is protected from corrosion by the glass. Preferably, the product is congealed in the form of a foam or a cavernous mass. This layer is formed in the furnace during the first melting. It can be obtained by various methods, for example by blowing gases into the product during the first melting or by introducing into the charge to be melted components which evolve gases at high temperature, or again by first heating cullet so as to obtain a frit covering the walls of the tank.

A number of embodiments of the invention are illustrated by way of example in the drawings.

FIGURE 1 is a vertical section through a furnace according to the invention.

FIGURE 2 is a fragmentary section along the line II—II of FIGURE 1.

FIGURE 3 is a diagrammatic illustration of another arrangement of a furnace according to the invention.

In FIGURE 1, the furnace is composed of a tank or crucible 1 containing the molten materials and of an exchanger column 2. The crucible 1 and the column 2 are surrounded by a coating 3 of insulating material. The column 2 is formed of a wall 4 of refractory material and is provided at its top with a fume extraction orifice 5. The column 2 is closed at the top by a plate 6 provided with a flap 7 for the introduction of vitrifiable composition into the furnace.

In accordance with the invention, the tank or crucible 1 is formed of a metallic jacket 8 composed of an inner sheet-metal section 9 and of an outer sheet-metal section 10 forming a fluidtight chamber 11. The double wall is formed with a discharge orifice 12. The chamber 11 is provided with a duct 13 through which cooling air is supplied from the fan 14, and also with a duct 15 serving for the discharge of the hot air. The crucible is also equipped with one or more burners 16, of which only one has been shown. The burners are fed with combustion air through the pipe 15, the superheater 17 and a pipe 18. If desired, the superheater 17 is placed out of circuit by the pipe 19, which is normally closed by the valve 20.

Although the refractory wall of the furnace may be entirely replaced by a double-walled metallic jacket, it is more advantageous to make the wall 4 of the column 2 of a refractory material, mainly in order to prevent extraction of an excessive quantity of heat by the cooling fluid. Preferably, the jacket rises to a short distance above the surface of the glass bath in order to avoid contact between the refractories and the bath.

In one constructional form of the orifice 12 (FIGURE 2) for the discharge of the molten glass, this orifice is extended by a discharge channel 21. Although this channel may be made with a double metallic wall, it is more advantageous to interrupt the jacket 8 around the orifice 12 and to dispose therein bricks 22 of refractory material so that there is no danger of the outlet orifice being obstructed by congealment of the glass. Likewise, the channel 21 is preferably formed of a refractory wall 23.

The vitrifiable composition is introduced into the furnace through the flap 7 and falls in scattered form into the column 2, being heated in contact with the fumes rising in the column. The glass is worked in the crucible 1, from which it is discharged through the orifice 12. On the other hand, the fan 14 blows air through the pipe 13 into the chamber 11, in which the air serves as a cooling agent. The air is discharged through the duct 15 and superheated in the apparatus 17, which may in addition receive cold air through the duct 24, and the heated air is utilized as combustion air in the burners 16, which inject the flames into the crucible 1. The fumes leaving the glass rise in the column 2, in which they heat the vitrifiable composition and from which they are discharged through the orifice 5 to the chimney (not shown).

FIGURE 3 diagrammatically illustrates another arrangement for heating the combustion air. Only the metallic jacket 8 forming the crucible 1 is shown therein. The said jacket, which encloses the chamber 11, is connected by the ducts 13 and 15 to a heat exchanger 25. The duct 13 has a circulation fan 14. The exchanger 25 and the chamber 11 are filled with a neutral gas, for example nitrogen, which is heated in the chamber 11 and gives up its heat in the exchanger 25 to the combustion air of the burners 16, which is introduced into the exchanger through the duct 26 and sent to the burners 16 through the duct 18.

The metal of which the jacket 8 is formed may be a refractory metal such as platinum, molybdenum or tungsten, or a corrosion-resistant alloy. Such an alloy is, for example, a steel alloyed with the following elements (in percentages in relation to the weight of the alloyed steel):

| | |
|---|---|
| Chromium | 8% to 30% |
| Nickel | 0% to 22% |
| Manganese | 0% to 2% |
| Molybdenum | 0% to 4% |

Good results have generally been obtained with a nickel-chromium alloy containing from 50% to 90% of nickel and from 10% to 50% of chromium. An ordinary steel such as a carbon steel is advantageously employed, which may be covered by a thin protective coating. The latter is either a metal or alloy such as those hereinbefore indicated, or a compound or a mixture of compounds such as alumina or zircon, or a refractory enamel whose composition may be chosen in the following range:

| | |
|---|---|
| $SiO_2$ | 50% to 70% |
| $Al_2O_3$ | 3% to 20% |
| BaO | 2% to 20% |
| $Cr_2O_3$ | 0% to 30% |
| $Na_2O$ | 2% to 10% |
| CaO | 2% to 8% |

It is obvious that it is also possible to coat the sheet metal with protective layers which vary in accordance with the fluids which are in contact, for example with molybdenum in the case of the faces in contact with the glass, and with refractory enamel in the case of the faces in contact with the air.

In the working of the furnace, it is possible to choose either the temperature of the fluid leaving the double wall or the quantity of heat extracted from the furnace. From this is deduced the rate of flow of fluid which is passed through the double wall. The wall is preferably maintained at a fairly low temperature so as to congeal a layer of glass on the wall. The thickness of congealed glass may also be determined by modifying the rate of flow of cooling fluid and its temperature when it enters the double wall.

Of course, the invention is not limited to the embodiments which have been described and illustrated by way of example, and modifications may be made thereto without departing from its scope.

We claim:

1. A glass melting shaft furnace comprising an opened top melting crucible formed of sheet metal in the absence of refractory brick, said metal adapted to extend above said glass level, an outlet surrounded by refractory materials extending onto the surface of said crucible adjacent said outlet, means to heat glass to a molten state in said crucible, a fluid tight jacket spaced from and completely surrounding said crucible, and means for circulating a cooling fluid through the resultant space between said jacket and said crucible.

2. A glass melting shaft furnace comprising an opened top melting crucible formed of sheet metal in the absence of refractory brick, said metal adapted to extend above said glass level, means to heat glass to a molten state in said crucible, a fluid tight jacket spaced from and completely surrounding said crucible, means for circulating a cooling fluid through the resultant space between said jacket and said crucible, and means to recover heat from said cooling fluid after circulation and to return said heat to aid the melting of said glass.

3. A glass making process comprising melting glass composition in a shaft furnace sheet metal crucible having no refractory brick and adapted to extend above the molten glass level, said crucible also having a fluidtight jacket spaced from and completely surrounding said crucible, melting said glass with at least one burner at the bottom of said crucible, circulating a cooling fluid through said space sufficient to produce a layer of congealed glass on the interior surface of said crucible, whereby said molten glass is separated from said crucible by said layer, and feeding said circulated cooling fluid to said burner.

4. The process of claim 3 wherein said fluid is superheated between said circulation and said burner.

5. The process of claim 3 wherein said fluid assists combustion.

6. A glass making process comprising melting glass composition in a shaft furnace sheet metal crucible having no refractory brick and adapted to extend above the molten glass level, said crucible also having a fluidtight jacket spaced from and completely surrounding said crucible, melting said glass with at least one burner at the bottom of said crucible, circulating a cooling fluid through said space sufficient to produce a layer of congealed glass on the interior surface of said crucible, whereby said molten glass is separated from said crucible by said layer, and feeding said circulated cooling fluid to a heat exchanger to surrender heat to the fuel for said burner.

7. A glass making process comprising melting glass composition in a shaft furnace sheet metal crucible having no refractory brick adapted to extend above the molten glass level, said crucible also having a fluidtight jacket spaced from and completely surrounding said crucible, circulating a cooling fluid through said space sufficient to produce a layer of congealed glass on the interior surface of said crucible, and forming gases in situ by compounds incorporated in the glass composition to aid the production of said congealed glass layer, whereby said molten glass is separated from said crucible by said layer.

8. A glass making process comprising melting glass composition in a shaft furnace sheet metal crucible having no refractory brick adapted to extend above the molten glass level, said crucible also having a fluidtight jacket spaced from and completely surrounding said crucible, circulating a cooling fluid through said space sufficient to produce a layer of congealed glass on the interior surface of said crucible, and blowing gases into said molten glass from an outside source to aid the production of said congealed glass layer, whereby said molten glass is separated from crucible by said layer.

References Cited by the Examiner

UNITED STATES PATENTS

| Number | Date | Name | Class |
|---|---|---|---|
| 56,746 | 7/1866 | Grout. | |
| 214,572 | 4/1879 | Lerffgen | 263—48 |
| 273,840 | 3/1883 | Herreshoff | 266—32 |
| 792,705 | 6/1905 | Hurley | 263—44 |
| 1,539,924 | 6/1925 | Waite et al. | |
| 1,713,237 | 5/1929 | Morin | 263—29 X |
| 1,995,349 | 3/1935 | Heinicke | 266—39 X |
| 2,262,826 | 11/1941 | Willets | 263—47 X |
| 2,272,930 | 2/1942 | Black | 65—22 |
| 2,321,480 | 6/1943 | Gaskell | 263—44 |
| 2,616,221 | 11/1952 | Hanson | 65—326 XR |
| 2,686,825 | 8/1954 | Southern | 13—31 X |
| 2,707,353 | 5/1955 | Honiss | 263—44 X |
| 2,718,096 | 9/1955 | Henry et al. | 263—21 X |
| 2,777,254 | 1/1957 | Seifert et al. | 65—374 X |
| 2,958,161 | 11/1960 | Palmer | 263—29 X |

FREDERICK L. MATTESON, JR., *Primary Examiner.*

DONALD H. SYLVESTER, CHARLES SUKALO, WILLIAM F. O'DEA, *Examiners.*

D. CRUPAIN, D. A. TAMBURRO, *Assistant Examiners.*